United States Patent
Kim et al.

(10) Patent No.: US 12,534,223 B2
(45) Date of Patent: Jan. 27, 2026

(54) UNMANNED ROBOT FOR URBAN AIR MOBILITY VEHICLE AND URBAN AIR MOBILITY VEHICLE

(71) Applicants: Hyundai Motor Company, Seoul (KR); Kia Corporation, Seoul (KR)

(72) Inventors: Kye Yoon Kim, Gunpo-Si (KR); Ji A Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 173 days.

(21) Appl. No.: 18/195,785

(22) Filed: May 10, 2023

(65) Prior Publication Data
US 2024/0199228 A1 Jun. 20, 2024

(30) Foreign Application Priority Data
Dec. 16, 2022 (KR) ........................ 10-2022-0177138

(51) Int. Cl.
| | |
|---|---|
| *B64F 1/00* | (2024.01) |
| *B64F 1/30* | (2006.01) |
| *G05D 1/656* | (2024.01) |
| *G08G 5/51* | (2025.01) |
| *G08G 5/80* | (2025.01) |

(52) U.S. Cl.
CPC ............... *B64F 1/002* (2013.01); *B64F 1/30* (2013.01); *G05D 1/656* (2024.01); *G08G 5/51* (2025.01); *G08G 5/80* (2025.01)

(58) Field of Classification Search
CPC ........... B64F 1/002; B64F 1/30; G05D 1/656; G08G 5/04; G08G 5/065
See application file for complete search history.

(56) References Cited

U.S. PATENT DOCUMENTS

| | | |
|---|---|---|
| 2013/0329052 A1 | 12/2013 | Chew |
| 2015/0102663 A1 | 4/2015 | Brouwer et al. |
| 2019/0224843 A1 | 7/2019 | Yang |
| 2019/0375093 A1 | 12/2019 | Kim et al. |

(Continued)

FOREIGN PATENT DOCUMENTS

| | | |
|---|---|---|
| JP | 6110316 B2 | 3/2017 |
| KR | 10 2018 0039379 A | 4/2018 |

(Continued)

*Primary Examiner* — Jason Holloway
*Assistant Examiner* — Christopher A Buksa
(74) *Attorney, Agent, or Firm* — MORGAN, LEWIS & BOCKIUS LLP (57) ABSTRACT

A unmanned robot for an urban air mobility vehicle includes: a processor; a communication module; and at least one storage medium operatively connected to the processor, wherein a program configured to be executable by the processor is recorded in the at least one storage medium, wherein the program may include commands for a control module configured to control performance of an operation according to the received command according to one of a first mode and a second mode, wherein the first mode may be a mode in which one or more of the unmanned robots move in synchronization with the urban air mobility vehicle, and the second mode may be a mode in which one or more of the unmanned robots are arranged on a road surface between a take-off and landing area of the urban air mobility vehicle and a gate to provide a moving path.

20 Claims, 7 Drawing Sheets

(56) References Cited

U.S. PATENT DOCUMENTS

| | | |
|---|---|---|
| 2020/0055594 A1 | 2/2020 | Tal et al. |
| 2020/0349852 A1 | 11/2020 | DiCosola |
| 2020/0380630 A1* | 12/2020 | Fujihara .................. G06Q 50/40 |
| 2021/0005095 A1* | 1/2021 | Govindillam ........ G08G 5/0082 |
| 2021/0031947 A1 | 2/2021 | Taras et al. |
| 2022/0146618 A1* | 5/2022 | Wu ..................... G01S 13/0209 |
| 2022/0266451 A1 | 8/2022 | Cristache |
| 2024/0125615 A1* | 4/2024 | Sameer ................ G06V 20/176 |

FOREIGN PATENT DOCUMENTS

| | | |
|---|---|---|
| KR | 10 2021 0047659 A | 4/2021 |
| KR | 10 2021 0127452 A | 10/2021 |

* cited by examiner

UNMANNED ROBOT FOR URBAN AIR MOBILITY VEHICLE AND URBAN AIR MOBILITY VEHICLE

CROSS-REFERENCE TO RELATED APPLICATION(S)

The present application claims priority to Korean Patent Application No. 10-2022-0177138 filed on Dec. 16, 2022, the entire contents of which is incorporated herein for all purposes by this reference.

BACKGROUND OF THE PRESENT DISCLOSURE

Field of the Present Disclosure

The present disclosure relates to an unmanned robot for an urban air mobility vehicle and an urban air mobility vehicle using the same.

Description of Related Art

A smooth operation of an urban air mobility vehicle requires various ground operations before the urban air mobility vehicle takes off or after the urban air mobility vehicle lands. In a course of urban air mobility vehicle movement for such ground operations, occasionally, the urban air mobility vehicle may collide with another urban air mobility vehicle or another object to cause damage to an airframe thereof, or may collide with a worker to result in an accident.

Furthermore, the absence of a separate indication of the route between a take-off and landing area of the urban air mobility vehicle and a gate may lead to passenger confusion regarding a moving path.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an unmanned robot for an urban air mobility vehicle and an urban air mobility vehicle using a same which can prevent accidents caused by collisions with other objects in advance and guide passengers to enter and exit safely.

According to an aspect of the present disclosure, an unmanned robot for an urban air mobility vehicle may include: a processor; a communication module operatively connected to the processor and configured to receive a command according to one of a first mode and a second mode; and at least one storage medium operatively connected to the processor, wherein a program configured to be executable by the processor is recorded in the at least one storage medium, wherein the program may include commands for a control module configured to control performance of an operation according to the received command according to the one of the first mode and the second mode, wherein the first mode may be a mode in which one or more of the unmanned robots move in synchronization with the urban air mobility vehicle while being arranged to surround the urban air mobility vehicle, and the second mode may be a mode in which one or more of the unmanned robots are arranged on a road surface between a take-off and landing area of the urban air mobility vehicle and a gate to provide a moving path for passengers to enter therefrom and exit therethrough.

According to another aspect of the present disclosure, an urban air mobility vehicle may include a processor; a communication module configured to transmit a command according to one of a first mode and a second mode; and at least one storage medium operatively connected to the processor, wherein a program configured to be executable by the processor is recorded in the at least one storage medium, wherein the program may include commands for a control module configured to control the communication module to transmit a command according to one of the first mode and the second mode to the unmanned robot, wherein the first mode may be a mode in which one or more of the unmanned robots move in synchronization with the urban air mobility vehicle while being arranged to surround the urban air mobility vehicle, and the second mode may be a mode in which one or more of the unmanned robots are arranged on a road surface between a take-off and landing area of the urban air mobility vehicle and a gate to provide a moving path for passengers to enter therefrom and exit therethrough.

According to another aspect of the present disclosure, there is provided a computer-readable storage medium for executing the above-described method on a computer.

According to an aspect of the present disclosure, a plurality of unmanned robots may move in synchronization with the urban air mobility vehicle while being arranged to surround an external periphery of the urban air mobility vehicle according to a command from a control server, and may warn of the risk of collision with other objects in advance, preventing accidents caused by collisions with other objects in advance.

Furthermore, according to an aspect of the present disclosure, a plurality of unmanned robots may be arranged on a road surface between an urban air mobility vehicle and a gate according to a command from a control server and may provide a moving path for passengers to enter or exit the urban air mobility vehicle, guiding the passengers to enter or exit safely.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alterative, modifications, equivalents and other embodiments, which may be included within the spirit and scope of the present disclosure as defined by the appended claims.

Hereinafter, various embodiments of the present disclosure will be described with reference to the appended drawings. The present disclosure may, however, be exemplified in various forms and should not be construed as being limited to the specific embodiments set forth herein. In the drawings, the shapes and dimensions of elements may be exaggerated for clarity, and the same reference numerals will be used throughout to designate the same or like elements.

Figure 1:
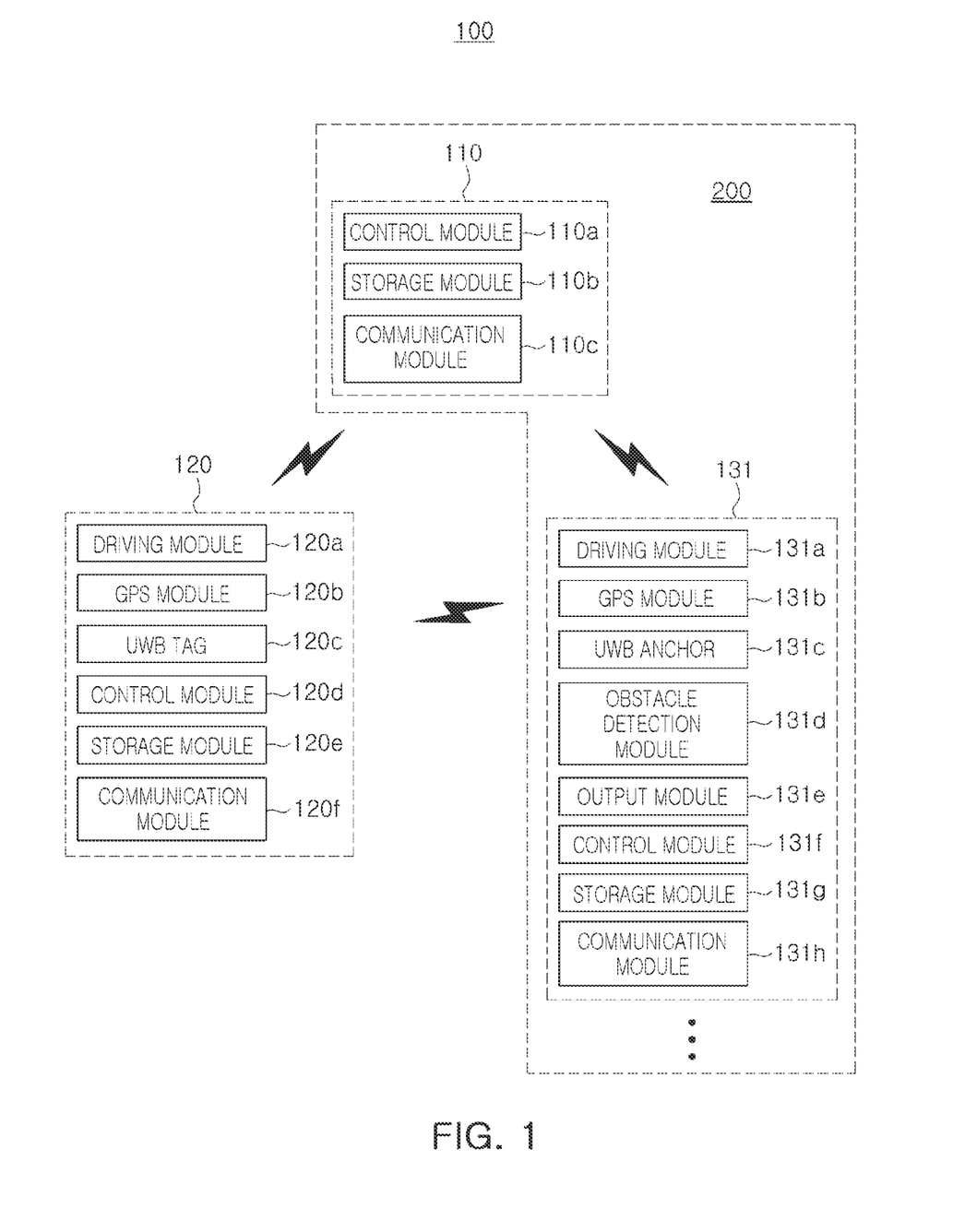
FIG. 1 is a schematic diagram of an entire system according to an exemplary embodiment of the present disclosure.
Figure 4A:
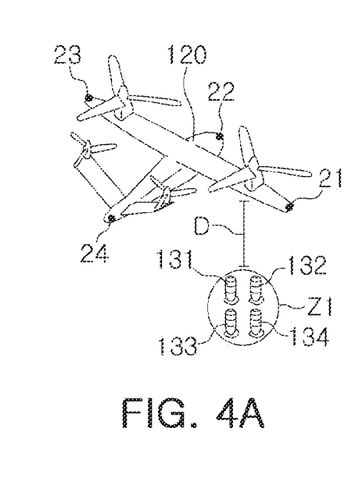
FIG. 4A, FIG. 4B, FIG. 4C, FIG. 4D and FIG. 4E are views exemplarily illustrating operations S303 and S304 of FIG. 3.
Figure 4B:
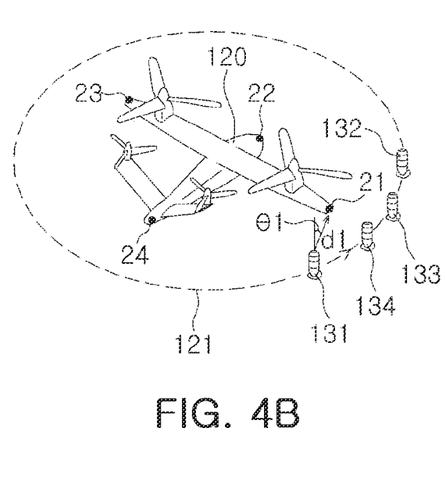
Figure 4C:
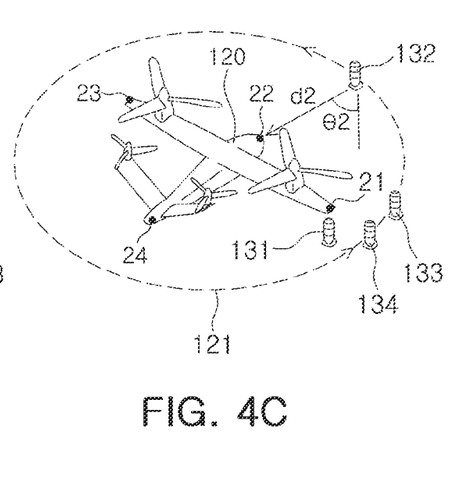

FIG. 1 is a schematic diagram of an entire system 100 according to an exemplary embodiment of the present disclosure, the entire system 100 may include an urban air mobility vehicle 120 and an unmanned robot system 200, and the unmanned robot system 200 may include a control server 110 and an unmanned robot 131. Although FIG. 1 illustrates only one unmanned robot 131 for convenience, the number thereof may be plural as illustrated in FIGS. 4A, 4B, 4C. 4D and 4E and 6.

In an exemplary embodiment of the present disclosure, the urban air mobility vehicle 120 may refer to an urban air mobility vehicle which may fly in the sky or taxi on the ground. In other words, urban air mobility vehicles configured for flying over the sky may include vehicles that can taxi on the ground using wheels and fly with the wheels separated from the ground, in addition to referring to aircrafts such as helicopters, drones, fixed-wing aircraft, and the like. Furthermore, the urban air mobility vehicle 120 may include a manned urban air mobility vehicle and an unmanned urban air mobility vehicle. The manned urban air mobility vehicle may include an airframe which may be operated by autonomous flight in addition to an airframe controlled by a pilot.

The urban air mobility vehicle 120 may include a driving module 120a, a Global Positioning System (GPS) module 120b, a UWB tag 120c, a control module 120d, a storage module 120e, and a communication module 120f.

The driving module 120a is a module for driving the urban air mobility vehicle 120 to fly or land along a preset path, and may include, for example, a driving motor, a propeller, and the like.

The global positioning system (GPS) module 120b may be a module for receiving location information of the urban air mobility vehicle 120, and the received location information may be transmitted to the control module 120d.

The UWB tag 120c may be a module for implementing an ultra-wideband (UWB) positioning technology configured to transmit a large amount of information at low power over a wide band.

The number of UWB tags 120c described above may be plural (21, 22, 23 and 24) as illustrated in FIGS. 4A-4E and 6 described below, and may be provided on an external periphery of the urban air mobility vehicle 120, for example, at end portions of left and right wings of the urban air mobility vehicle 120, an end portion of a tail wing, and an end portion of a front portion of a cockpit. According to an exemplary embodiment of the present disclosure, an installation position of the UWB tags 21, 22, 23 and 24 is limited to the external periphery of the urban air mobility vehicle 120, but may be changed as needed by those skilled in the art.

According to the above-described UWB positioning technology, a wireless signal transmitted from the UWB tag 120c may be received by an UWB anchor 131c, and direction information (e.g., an angle) and a distance from the UWB anchor 131c to the UWB tag 120c may be obtained based on the received wireless signal. The unmanned robot 131 provided with the UWB anchor 131c provided may precisely move to the corresponding UWB tag 120c based on the obtained direction information and distance. A detailed operation thereof will be described below.

Meanwhile, the control module 120d may transmit a ground operation support request, an entry and exit support request, or an entry and exit preparation notice to the control server 110 through the communication module 120f.

In an exemplary embodiment of the present disclosure, the ground operation refers to ground-level tasks performed at an aerodrome for the urban air mobility vehicle before the urban air mobility vehicle takes off or after the urban air mobility vehicle lands.

In other words, as described in conventional technology, the urban air mobility vehicle 120 may collide with another urban air mobility vehicle or another object during a movement to cause damage to an airframe thereof, or may collide with a worker to result in an accident, and to prevent such a collision in advance, the urban air mobility vehicle 120 may transmit the ground operation support request to the control server 110 during a ground operation. The ground operation support request may include location information of the urban air mobility vehicle 120.

In response to such a ground operation support request, the unmanned robot 131 may be arranged to surround the external periphery of the urban air mobility vehicle 120 and move in synchronization with the urban air mobility vehicle 120, and may detect and warn of the risk of collision between the urban air mobility vehicle 120 and other objects during the movement. A detailed operation thereof will be described below.

Meanwhile, the entry and exit support request may be a request for supporting entry and exit of passengers by providing a moving path between a take-off and landing area of the urban air mobility vehicle 120 and the gate.

Furthermore, the entry and exit preparation notice may be a notification informing preparation for entry into the urban air mobility vehicle 120 and exit from the urban air mobility vehicle 120. Depending on the entry and exit preparation notice, the unmanned robot 131 may be arranged on a road surface between the take-off and landing area of the urban air mobility vehicle 120 and the gate to provide a moving path for the passengers to enter therefrom and exit therethrough. A detailed operation will be described below.

The storage module 120e may be a module for storing various programs for implementing functions performed in the above-described control module 120d.

The communication module 120f may be a module for transmitting or receiving various kinds of data to or from the control server 110.

Meanwhile, the control server 110 may include a control module 110a, a storage module 110b, and a communication module 110c.

When the control module 110a receives a ground operation support request from the urban air mobility vehicle 120, a command according to a first mode may be transmitted to the unmanned robot 131.

Here, the first mode may be a mode in which the unmanned robot 131 moves in synchronization with the urban air mobility vehicle 120 while being arranged to surround the external periphery of the urban air mobility vehicle 120, and detects and warns of the risk of collision between the urban air mobility vehicle 120 and other objects during the movement. Furthermore, the command according to the first mode may include location information of the urban air mobility vehicle 120, information on the shape and size of the urban air mobility vehicle 120, ID of each UWB tag, and ID of the unmanned robot provided with a UWB anchor corresponding to the ID of each UWB tag.

Furthermore, the control module 110a may transmit awaiting command to the unmanned robot 131 when receiving the entry and exit support request from the urban air mobility vehicle 120. The waiting command may include location information of a second waiting point Z2 in which a plurality of unmanned robots 131, 132, 133, 134, 135 and 136 should wait. When receiving the waiting command, the unmanned robot 131 may move to the second waiting point and wait in advance.

Furthermore, when receiving the notification informing preparation for entry into the urban air mobility vehicle 120 and exit from the urban air mobility vehicle 120, the control module 110a may transmit a command according to a second mode to the unmanned robot 131.

Here, the second mode may be a mode in which the unmanned robot 131 is arranged on a road surface between a take-off and landing area of the urban air mobility vehicle 120 and a gate to provide a moving path for passengers to enter therefrom and exit therethrough. Furthermore, the command according to the second mode may include ID of the unmanned robot 131 and information on a location on a boundary line of the unmanned robot 131.

Meanwhile, the storage module 110b may be a module for storing various programs for implementing functions performed in the control module 110a.

The communication module 110c may be a module for transmitting or receiving various data to or from the urban air mobility vehicle 120 and the unmanned robot 131.

Meanwhile, the unmanned robot 131 may be a moving object that autonomously drives on the ground along a preset path using a driving device including wheels or a quadrupedal arrangement. The unmanned robot 131 may include a driving module 131a, a Global Positioning System (GPS) module 131b, a UWB anchor 131c, an obstacle detection module 131d, an output module 131e, a control module 131f, a storage module 131g, and a communication module 130h. Although only one unmanned robot 131 is illustrated in FIG. 1 for convenience, the number of unmanned robots may be plural as described above.

First, the driving module 131a is a module driving to move along the preset path, and may include, for example, a driving device including the wheels or the quadrupedal arrangement.

The Global Positioning System (GPS) module 131b is a module for receiving location information of the unmanned robot 131, and the received location information may be transmitted to the control module 131f.

The UWB anchor 131c may receive a wireless signal transmitted from the UWB tag 120c, and the received wireless signal may be transmitted to the control module 131f The UWB anchors 131c may be provided one by one in one unmanned robot. As illustrated in FIG. 4A, FIG. 4B, FIG. 4C, FIG. 4D and FIG. 4E, when there are provided a plurality of unmanned robots, the UWB anchors of each of the unmanned robots 131, 132, 133 and 134 may be assigned to each of the UWB tags 21, 22, 23 and 24 provided in the urban air mobility vehicle 120, and accordingly, the UWB anchors and the UWB tags may correspond in a one-to-one manner.

The obstacle detection module 131d may be a module for detecting an obstacle disposed in a movement direction during the movement. The detection results may be transmitted to the control module 131f. The obstacle detection module 131d may include, for example, a camera, a Light Detection and Ranging (LiDAR) sensor, and the like.

The output module 131e may output an alarm signal in an acoustic or visual manner in the first mode. Furthermore, the output module 131e may output guide information in an acoustic or visual manner in the second mode. The guidance information may include at least one of a movement direction, a flight number, a number of a baggage receiving stand, and a current time. The output module 131e may include a speaker device, a display device, a projector, and the like.

When the command according to the first mode is received from the control server 110, the control module 131f may move the unmanned robot 131 to the first waiting point spaced from the urban air mobility vehicle 120 by a preset separation distance.

Accordingly, the control module 131f may move the unmanned robot 131 from the first waiting point to a UWB tag including a tag ID corresponding to the ID of the unmanned robot 131.

Furthermore, the control module 131f may receive a moving path and speed of the urban air mobility vehicle 120 from the control server 110, and move the unmanned robot 131 according to the received moving path and speed of the urban air mobility vehicle 120, thus moving the unmanned robot 131 in synchronization with the urban air mobility vehicle 120.

Furthermore, the control module 131f may output the alarm signal through the output module 131e according to the detection results received from the obstacle detection module 131d. Furthermore, according to an exemplary embodiment of the present disclosure, when an obstacle is detected, the control module 131f may transmit the alarm signal to the urban air mobility vehicle 120 along with the ID of the unmanned robot 131 so that the urban air mobility vehicle 120 may stop.

According to another exemplary embodiment of the present disclosure, when receiving a waiting command from the control server 110, the control module 131f may move the unmanned robot 131 to the second waiting point and wait in advance.

Furthermore, when the command according to the second mode is received from the control server 110, the control module 131f may move the unmanned robot 131 from the second waiting point to a predetermined location on the boundary line and form the moving path.

Accordingly, the control module 131f may output guide information in the acoustic or visual manner through the output module. As described above, the guide information may include at least one of the movement direction, the flight number, a number of the baggage receiving stand, and the current time.

Furthermore, the control module 131f may obtain direction information (e.g., an angle) and a distance to the UWB tag 120c based on the wireless signal received from the UWB anchor 131c. The unmanned robot 131 provided with the UWB anchor 131c may precisely move to the corresponding UWB tag 120c based on the obtained direction information and distance. A detailed operation thereof will be described below.

The storage module 131g may be a module for storing various programs for implementing functions performed by the control module 131f or map data of an aerodrome.

The communication module 130h may be a module for transmitting or receiving various kinds of data to or from the control server 110.

Figure 6:
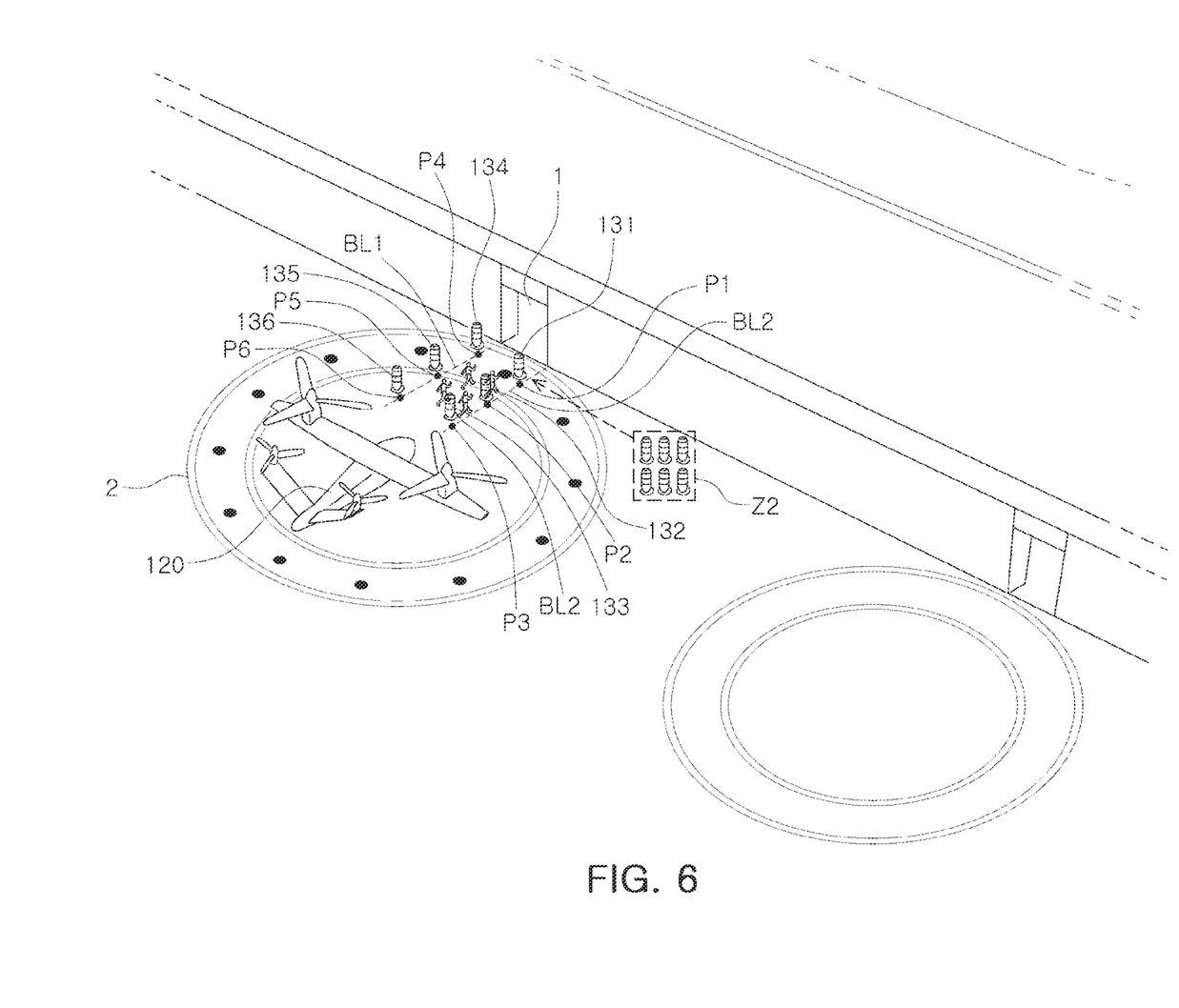
FIG. 6 is a view exemplarily illustrating operations S503 to S506 of FIG. 5.
Figure 7:
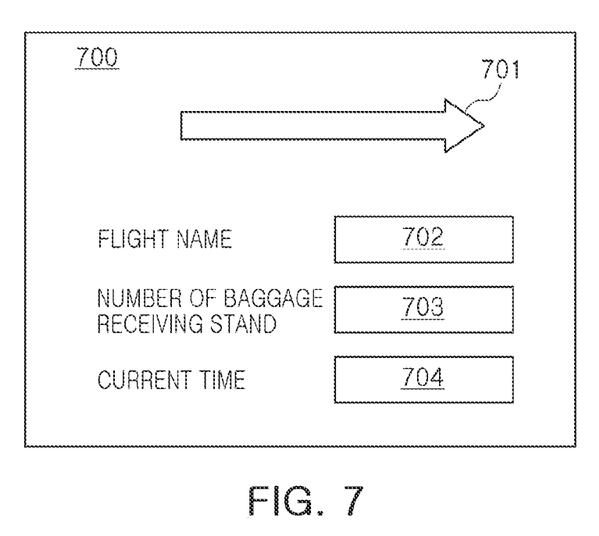
FIG. 7 is a view exemplarily illustrating guide information output in operation S507 of FIG. 5.

Hereinafter, a method of operating an unmanned robot system according to an exemplary embodiment of the present disclosure will be described with reference to FIGS. 2 and 7.

Figure 2:
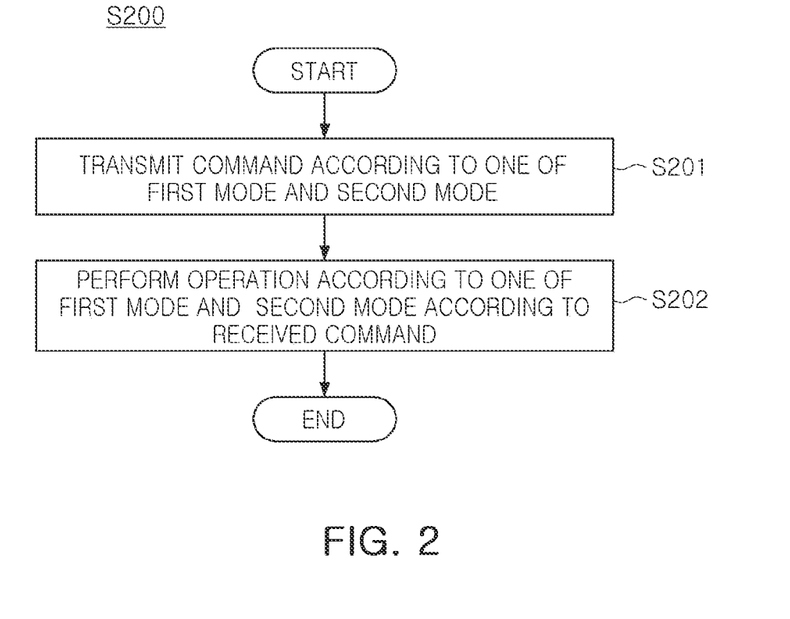
FIG. 2 is a flowchart illustrating a method of operating an unmanned robot system according to an exemplary embodiment of the present disclosure.

First, FIG. 2 is a flowchart illustrating a method of operating the unmanned robot system according to an exemplary embodiment of the present disclosure.

As illustrated in FIG. 2, an operation method (S200) of the unmanned robot system according to various exemplary embodiments of the present disclosure may include transmitting, by the control server 110, the command according to one of the first mode and the second mode to a plurality of unmanned robots (S201), and performing an operation according to any one of the first mode and the second mode according to the command received from the plurality of unmanned robots (S202).

Here, as described above, the first mode may be a mode in which the plurality of unmanned robots move in synchronization with the urban air mobility vehicle 120 while being arranged to surround the external periphery of the urban air mobility vehicle 120, and detect and warn of the risk of collision between the urban air mobility vehicle 120 and other objects during the movement. The second mode may be a mode in which the plurality of unmanned robots are arranged on the road surface between the take-off and landing area of the urban air mobility vehicle 120 and the gate to provide the moving path for the passengers to enter therefrom and exit therethrough.

Hereinafter, the plurality of unmanned robots for the urban air mobility vehicle according to an exemplary embodiment of the present disclosure and an operating method thereof will be described by distinguishing a first mode from a second mode with reference to FIGS. 3 to 7.

1. First Mode

Figure 3:
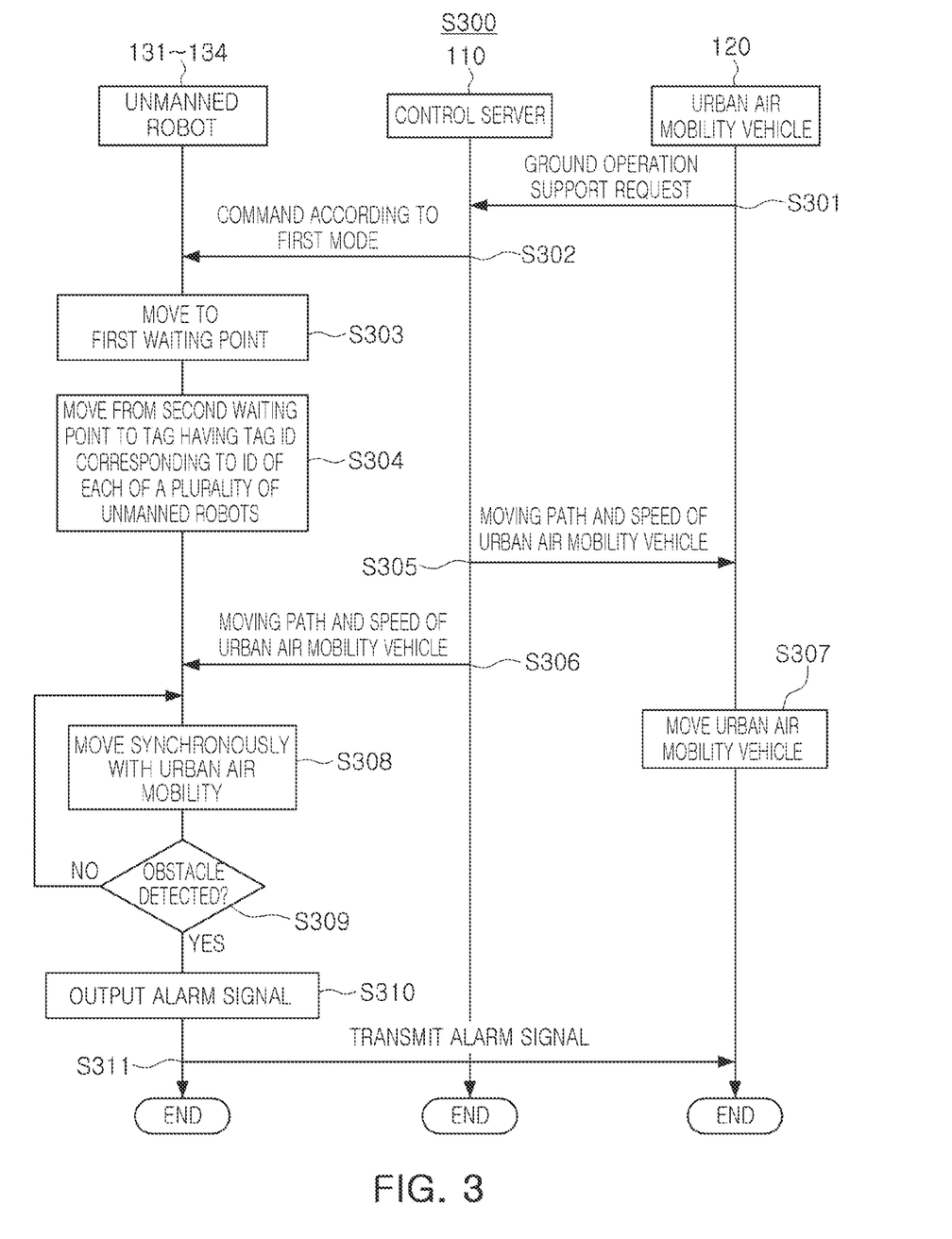
FIG. 3 is a flowchart illustrating a method of operating an unmanned robot system according to a first mode according to an exemplary embodiment of the present disclosure.

FIG. 3 is a flowchart illustrating a method of operating an unmanned robot system according to the first mode according to an exemplary embodiment of the present disclosure. Furthermore, FIGS. 4A and 4E are views exemplarily illustrating operations S303 and S304 of FIG. 3.

As illustrated in FIG. 3, an operation method (S300) of the unmanned robot system according to the first mode of the present disclosure may be initiated by operation of transmitting the ground operation support request from the urban air mobility vehicle 120 to the control server 110 (S301). As described above, the ground operation refers to ground-level tasks performed at an aerodrome for the urban air mobility vehicle before the urban air mobility vehicle takes off or after the urban air mobility vehicle lands.

Accordingly, the control server 110 may transmit the command according to the first mode to the plurality of unmanned robots 131, 132, 133 and 134. Here, the command according to the first mode may include location information of the urban air mobility vehicle 120, information on the shape and size of the urban air mobility vehicle 120, ID of each of the UWB tags 21, 22, 23 and 24, and ID of the plurality of unmanned robots 131, 132, 133 and 134 provided with the UWB anchor corresponding to the ID of each of the UWB tags 21, 22, 23 and 24.

Accordingly, each of the unmanned robots 131, 132, 133 and 134 may move to a first waiting point Z1 spaced from the urban air mobility vehicle 120 by a predetermined separation distance D based on the location information of the urban air mobility vehicle 120 (S303).

Accordingly, each of the unmanned robots 131, 132, 133 and 134 may move from the first waiting point Z1 to the UWB tags 21, 22, 23 and 24 including the tag ID corresponding to each of the unmanned robots 131, 132, 133 and 134 based on the information on the shape and size of the urban air mobility vehicle 120, the ID of each of the UWB tags 21, 22, 23 and 24, and the ID of the unmanned robot provided with the UWB anchor corresponding to each of the UWB tags 21, 22, 23 and 24 (S304).

Hereinafter, the operations S303 and S304 described above will be exemplarily described with reference to FIGS. 4A, 4B, 4C, 4D and 4E.

First, as illustrated in FIGS. 4A, 4B, 4C, 4D and 4E, the UWB tags 21, 22, 23 and 24 may be provided on the external periphery of the urban air mobility vehicle 120, and the installation position of the UWB tags 21, 22, 23 and 24 may include the end portions of the left and right wings of the urban air mobility vehicle 120, the end portion of the tail wing, and the end portion of the front portion of the cockpit.

Furthermore, as illustrated in FIGS. 4A, 4B, 4C, 4D and 4E, it is assumed that the first unmanned robot 131 is provided with a UWB anchor corresponding to the ID of the first UWB tag 21, the second unmanned robot 132 is provided with a UWB anchor corresponding to the ID of the second UWB tag 22, the third unmanned robot 133 is provided with a UWB anchor corresponding to the ID of the third UWB tag 23, and the fourth unmanned robot 134 is provided with a UWB anchor corresponding to the ID of the fourth UWB tag 24.

First, as illustrated in FIG. 4A, each of the unmanned robots 131, 132, 133 and 134 may move to the first waiting point Z1 space apart from the urban air mobility vehicle 120 by the predetermined separation distance D based on the location information of the urban air mobility vehicle 120.

Accordingly, as illustrated in FIGS. 4B to 4E, each of the unmanned robots 131, 132, 133 and 134 may rotate along a virtual path 121 including the urban air mobility vehicle 120, but may stop at a point at which the intensity of the wireless signal from the UWB tag including the corresponding tag ID is the greatest. Here, the virtual path 121 may include various shapes such as virtual ellipses, circles, and polygons, formed to surround the urban air mobility vehicle 120 based on the information on the shape and size of the urban air mobility vehicle 120.

Accordingly, each of the unmanned robots 131, 132, 133 and 134 may move to the UWB tag including the corresponding tag ID based on information on the distance and the direction to the UWB tag including the corresponding tag ID.

That is, as illustrated in FIG. 4B, the first unmanned robot 131 may rotate along the virtual path 121 but stop at the point at which the intensity of the wireless signal from the UWB tag 21 including the corresponding tag ID is the greatest. Accordingly, the first unmanned robot 131 may move to the UWB tag 21 including a corresponding tag ID based on the information on a distance d1 and a direction θ1 to the UWB tag 21 including the corresponding tag ID.

Furthermore, as illustrated in FIG. 4C, the second unmanned robot 132 may rotate along the virtual path 121 but stop at the point at which the intensity of the wireless signal from the UWB tag 22 including the corresponding tag ID is the greatest. Accordingly, the second unmanned robot 132 may move to the UWB tag 22 including a corresponding tag ID based on the information on a distance d2 and a direction θ2 to the UWB tag 22 including the corresponding tag ID.

Figure 4D:
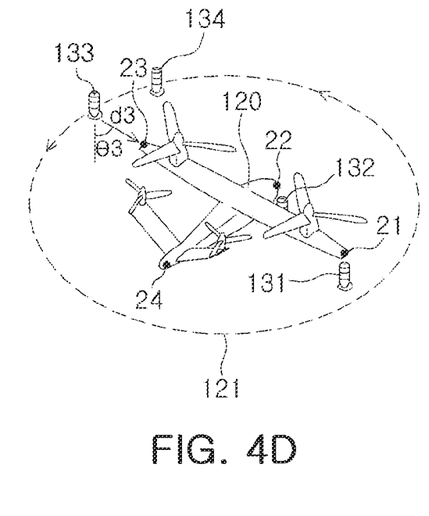
Figure 4E:
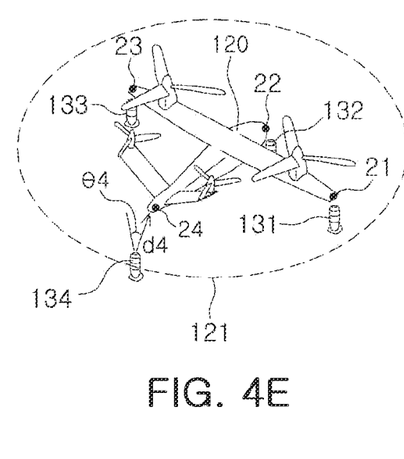

Similarly, as illustrated in FIG. 4D, the third unmanned robot 133 may rotate along the virtual path 121 but stop at the point at which the intensity of the wireless signal from the UWB tag 23 including the corresponding tag ID is greatest. Accordingly, the third unmanned robot 133 may move to the UWB tag 23 including a corresponding tag ID based on the information on a distance d3 and a direction θ3 to the UWB tag 23 including the corresponding tag ID.

Furthermore, as illustrated in FIG. 4E, the fourth unmanned robot 134 may rotate along the virtual path 121 but stop at the point at which the intensity of the wireless signal from the UWB tag 24 including the corresponding tag ID is greatest. Accordingly, the fourth unmanned robot 134 may move to the UWB tag 24 including a corresponding tag ID based on the information on a distance d4 and a direction θ4 to the UWB tag 24 including the corresponding tag ID.

Accordingly, the control server 110 may transmit a moving path and speed for the ground operation to the plurality of unmanned robots 131, 132, 133 and 134 and the urban air mobility vehicle 120 (S305 and S306).

Accordingly, the urban air mobility vehicle 120 may move according to the received movement path and speed (S307), and each of the unmanned robots 131, 132, 133 and 134 may move synchronously with the urban air mobility vehicle 120 according to a same movement path and speed as the urban air mobility vehicle 120 (S308).

In the instant case, each of the unmanned robots 131, 132, 133 and 134 may reduce a distance error with the corresponding UWB tags 21, 22, 23 and 24 by increasing a direction and speed according to information on the distance and direction to the UWB tags 21, 22, 23 and 24 including the corresponding tag ID during the movement.

Meanwhile, the plurality of unmanned robots 131, 132, 133 and 134 may detect an obstacle disposed in a movement direction during the movement (S309). When the obstacle is detected, the plurality of unmanned robots 131, 132, 133 and 134 may output the alarm signal (S310). In the instant case, the output alarm may be output in an acoustic or visual manner. Alternatively, the plurality of unmanned robots 131, 132, 133 and 134 may transmit the alarm signal along with the ID of the corresponding unmanned robot to the urban air mobility vehicle 120 (S311).

2. Second Mode

Figure 5:
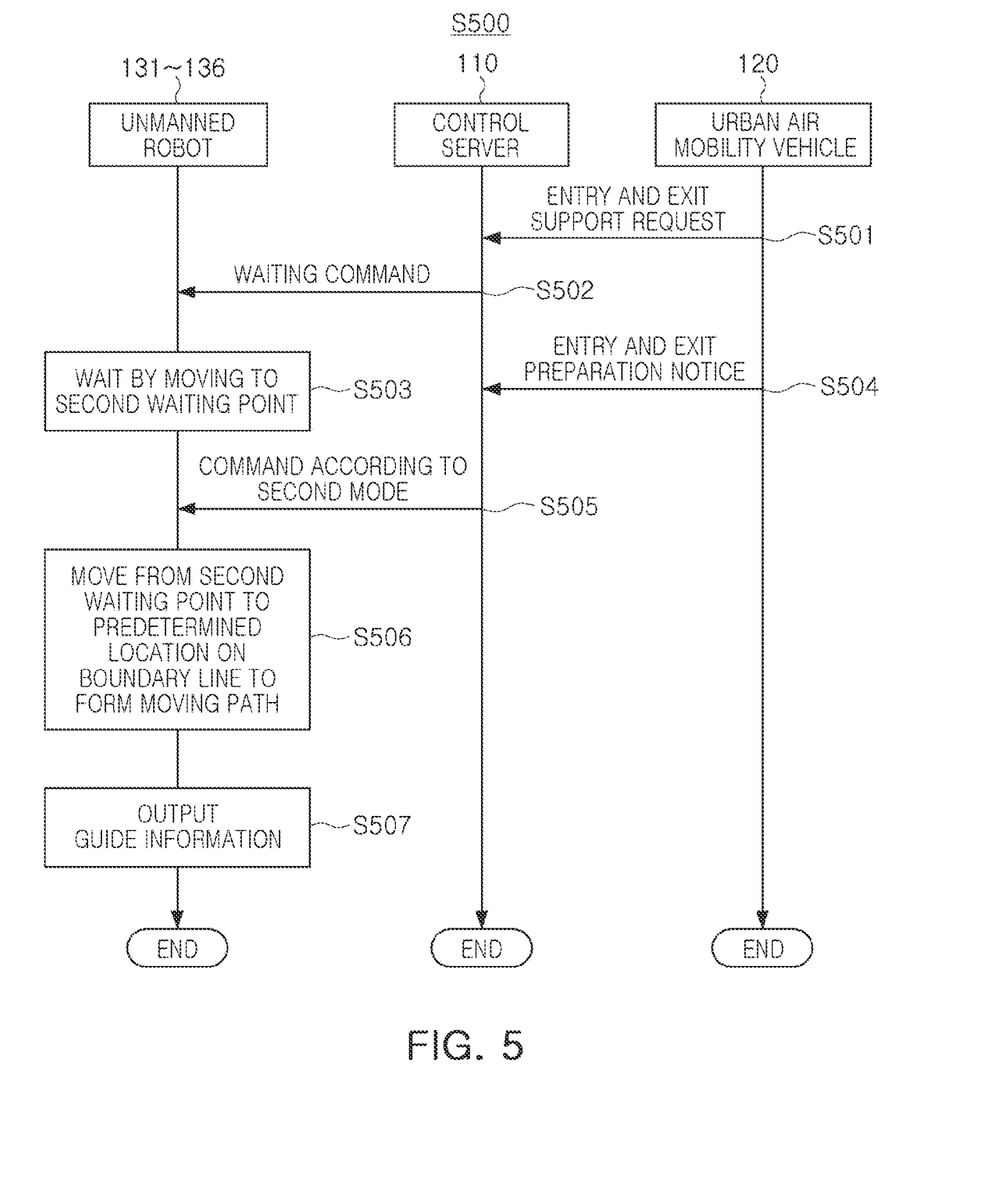
FIG. 5 is a flowchart illustrating a method of operating an unmanned robot system according to a second mode according to an exemplary embodiment of the present disclosure.

FIG. 5 is a flowchart illustrating a method of operating an unmanned robot system according to the second mode according to an exemplary embodiment of the present disclosure. FIG. 6 is a view exemplarily illustrating operations S503 to S506 of FIG. 5, and FIG. 7 is a view exemplarily illustrating guide information output in operation 507 of FIG. 5.

First, as illustrated in FIG. 5, an operation method (S500) of the unmanned robot system according to the second mode of the present disclosure may be initiated by operation of transmitting an entry and exit support request from the urban air mobility vehicle 120 to the control server 110 (S501). As described above, the entry and exit support request may be a request for supporting entry and exit of the passengers by providing the moving path between the take-off and landing area of the urban air mobility vehicle 120 and the gate.

Accordingly, the control server 110 may transmit a waiting command to the plurality of unmanned robots 131, 132, 133, 134, 135 and 136 (S502). As described above, the waiting command may include location information of the second waiting point Z2 in which the plurality of unmanned robots 131, 132, 133, 134, 135 and 136 should wait.

When the waiting command is received, as illustrated in FIG. 6, the plurality of unmanned robots 131, 132, 133, 134, 135 and 136 may move to the second waiting point Z2 and wait in advance (S503).

Accordingly, the urban air mobility vehicle 120 may transmit an entry and exit preparation notice to the control server 110 (S504). As described above, the entry and exit preparation notice may be a notification informing preparation for entry into the urban air mobility vehicle 120 and exit from the urban air mobility vehicle 120.

Accordingly, the control server 110 may transmit the command according to the second mode to the plurality of unmanned robots 131 to 136. Here, as illustrated in FIG. 6, the command according to the second mode may include the ID of the plurality of unmanned robots 131, 132, 133, 134, 135 and 136 and the information on locations on boundary lines BL1 and BL2 of each of the unmanned robots 131 to 136.

Here, as illustrated in FIG. 6, the boundary line may include a first boundary line BL1 and a second boundary line BL2 for forming a movement path between a take-off and landing area of 2 of the urban air mobility vehicle 120 and a gate 1.

Accordingly, as illustrated in FIG. 6, each of the unmanned robots 131, 132, 133, 134, 135 and 136 may move from the second waiting point Z2 to predetermined positions P1, P2, P3, P4, P5 and P6 on the boundary lines BL1 and BL2 based on the location information on the boundary lines BL1 and BL2.

Accordingly, each of the unmanned robots 131, 132, 133, 134, 135 and 136 may output the guide information in an acoustic or visual manner. As illustrated in FIG. 7, the guide information may include at least one of a movement direction 701, a flight number 702, a number 703 of the baggage receiving stand, and a current time 704.

Meanwhile, after all the passengers get off the urban air mobility vehicle 120, the operation method of the unmanned robot system according to the first mode as illustrated in FIG. 3 and FIG. 4A to 4E may be applied. In the instant case, the first waiting point Z1 of the operation S303 illustrated in FIG. 3 may be replaced with the boundary lines B1 and BL2 illustrated in FIG. 6, and only four of the six unmanned robots 131, 132, 133, 134, 135 and 136 may be used.

As described above, according to an exemplary embodiment of the present disclosure, the plurality of unmanned robots may move in synchronization with the urban air mobility vehicle while being arranged to surround the external periphery of the urban air mobility vehicle according to the command from the control server, and may warn of the risk of collision with other objects in advance, preventing accidents caused by collisions with other objects in advance.

Furthermore, according to an exemplary embodiment of the present disclosure, the plurality of unmanned robots may be arranged on the road surface between the urban air mobility vehicle and the gate to provide the moving path for passengers to enter and exit, which may guide the passengers on or off safely.

Figure 8:
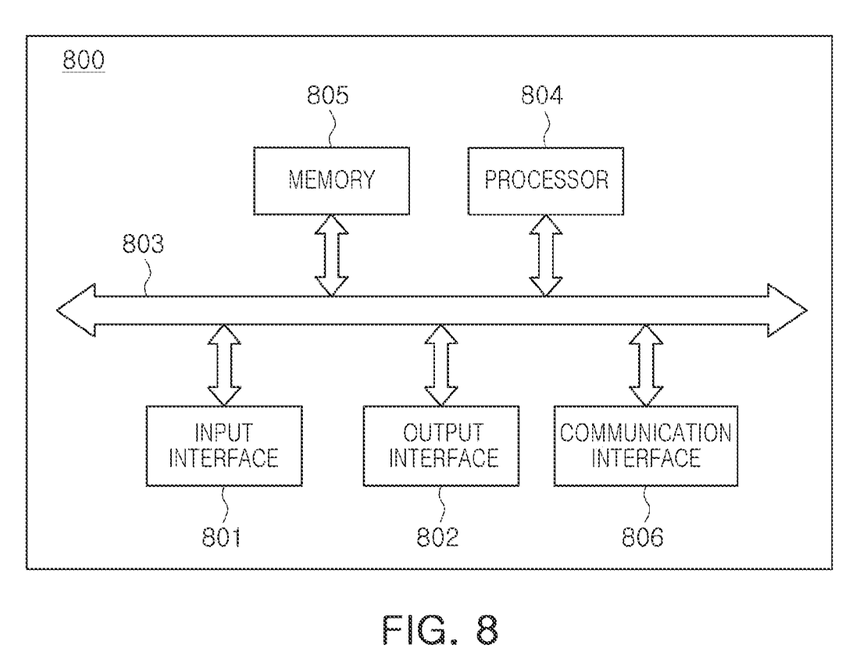
FIG. 8 is a block diagram of a computer device which may entirely or partially implement the entire system according to an exemplary embodiment of the present disclosure.

Meanwhile, FIG. 8 is a block diagram of a computer device which may entirely or partially implement the entire system according to an exemplary embodiment of the present disclosure, and may be applied to the control server 110, the urban air mobility vehicle 120, and the unmanned robot 131 illustrated in FIG. 1.

As illustrated in FIG. 8, the computer device 800 may include an input interface 801, an output interface 802, a processor 804, a memory 805, and a communication interface 806, and the input interface 801, the output interface 802, the processor 804, the memory 805, and the communication interface 806 may be connected to each other through a system bus 803.

In an exemplary embodiment of the present disclosure, the memory 805 may be used to store a program, command, or code, and the processor 804 may perform the program, command, or code stored in the memory 805, control the input interface 801 to receive a signal, and control the output interface 802 to transmit the signal. The memory 805 may include a read-only memory and a random access memory, and may provide commands and data to the processor 804.

It should be understood that in an exemplary embodiment of the present disclosure, the processor 804 may be a central processing unit (CPU), or the processor 804 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

In an example embodiment, the method performed in each device of FIG. 1 may be completed by an integrated logic circuit of hardware in the processor 804 or instructions in a form of software. The content of the method included in conjunction with the exemplary embodiments of the present disclosure may be directly embodied and executed by a hardware processor, or may be executed and completed by a combination of hardware and software modules in the processor. The software module may be disposed in a storage medium in the art, such as random access memory, flash memory, read-only memory, programmable read-only memory, or electrically erasable programmable memory, and registers. The storage medium is disposed in the memory 805, and the processor 804 reads information from the memory 805 and is configured to perform operations of the above-described method in combination with its hardware. To avoid repetition, they will be omitted in detail here.

For convenience in explanation and accurate definition in the appended claims, the terms "upper", "lower", "inner", "outer", "up", "down", "upwards", "downwards", "front", "rear", "back", "inside", "outside", "inwardly". "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An unmanned robot for an urban air mobility vehicle, the unmanned robot comprising:

a processor;

a communication module operatively connected to the processor and configured to receive a command according to one of a first mode and a second mode;

at least one storage medium operatively connected to the processor, wherein a program configured to be executable by the processor is recorded in the at least one storage medium; and a control module, wherein the program includes commands for the control module configured to control performance of an operation according to the received command according to the one of the first mode and the second mode, wherein the first mode is a mode in which two or more of unmanned robots move in synchronization with the urban air mobility vehicle while being arranged to surround the urban air mobility vehicle, and wherein the second mode is a mode in which two or more of the unmanned robots are arranged on a boundary line including a first boundary line and a second boundary line between a take-off and landing area of the urban air mobility vehicle and a gate to provide a moving path for passengers to enter therefrom and exit therethrough.

2. The unmanned robot of claim 1, further including an ultra-wideband (UWB) anchor, wherein the command according to the first mode includes information on a location of the urban air mobility vehicle, information on a shape and a size of the urban air mobility vehicle, ID of a UWB tag included in the urban air mobility vehicle, and ID of the unmanned robot provided with the UWB anchor corresponding to the UWB tag.

3. The unmanned robot of claim 2, further including a driving module, wherein the control module is configured to:

control the driving module to move the unmanned robot to a first waiting point spaced from the urban air mobility vehicle by a preset distance based on the information on the location of the urban air mobility vehicle, and control the driving module to move the unmanned robot from the first waiting point to a tag including a tag ID corresponding to the ID of the unmanned robot based on the information on the shape and the size of the urban air mobility vehicle, and the ID of the UWB tag and the ID of the unmanned robot provided with the UWB anchor corresponding to the UWB tag.

4. The unmanned robot of claim 3,
wherein the control module is configured to rotate along a virtual path including the urban air mobility vehicle, the virtual path being formed to surround the urban air mobility vehicle based on the information on the shape and the size of the urban air mobility vehicle, and
wherein after the control module stops at a point where an intensity of a wireless signal from a UWB tag including corresponding tag ID is greatest, the control module is configured to control the driving module to move the unmanned robot to the UWB tag including the corresponding tag ID based on information on a distance and a direction to the UWB tag including the corresponding tag ID.

5. The unmanned robot of claim 3,
wherein the communication module further receives a moving path and speed of the urban air mobility vehicle for a ground operation, and
wherein the control module is configured to control the driving module to move the unmanned robot synchronously with the urban air mobility vehicle according to the received moving path and speed.

6. The unmanned robot of claim 5, wherein the control module is configured to control the driving module to reduce a distance error from a UWB tag by increasing or decreasing a direction and speed according to information on a distance and a direction to the corresponding UWB tag including corresponding tag ID during movement.

7. The unmanned robot of claim 2, further including:
an obstacle detection module configured detect at least one obstacle disposed in a movement direction during movement of the unmanned robot; and
an output module configured to output an alarm signal based on the at least one obstacle being detected.

8. The unmanned robot of claim 7, wherein the alarm signal is output acoustically or visually.

9. The unmanned robot of claim 1,
wherein the command according to the second mode includes ID of the unmanned robot and information on a location on the boundary line of the unmanned robot.

10. The unmanned robot of claim 9, further including a driving module,
wherein the communication module is configured to receive a waiting command including location information of a second waiting point at which the unmanned robot waits, and
wherein the control module is configured to control the driving module for the unmanned robot to move to the second waiting point and wait in advance based on the location information of the second waiting point.

11. The unmanned robot of claim 10, wherein the control module is configured to control the driving module to move the unmanned robot from the second waiting point to a predetermined location on the boundary line to form the moving path based on the information on the location on the boundary line based on the command according to the second mode being received.

12. The unmanned robot of claim 11, further including an output module configured to output guide information acoustically visually,
wherein the guidance information includes at least one of a movement direction, a flight number, a number of a baggage receiving stand, and a current time.

13. An urban air mobility vehicle, comprising:
a processor;
a communication module operatively connected to the processor and configured to transmit a command according to one of a first mode and a second mode;
at least one storage medium operatively connected to the processor, wherein a program configured to be executable by the processor is recorded in the at least one storage medium; and
a control module,
wherein the program includes commands for the control module configured to control the communication module to transmit a command according to one of the first mode and the second mode to an unmanned robot,
wherein the first mode is a mode in which two or more of unmanned robots move in synchronization with the urban air mobility vehicle while being arranged to surround the urban air mobility vehicle, and
wherein the second mode is a mode in which two or more of the unmanned robots are arranged on a boundary line including a first boundary line and a second boundary line between a take-off and landing area of the urban air mobility vehicle and a gate to provide a moving path for passengers to enter therefrom and exit therethrough.

14. The urban air mobility vehicle of claim 13, further including an ultra-wideband (UWB) tag,
wherein the command according to the first mode includes information on a location of the urban air mobility vehicle, information on a shape and a size of the urban air mobility vehicle, ID of the UWB tag, and ID of the unmanned robot provided with an UWB anchor corresponding to the UWB tag.

15. The urban air mobility vehicle of claim 14, wherein an installation position of the UWB tag includes at least one of end portions of left and right wings of the urban air mobility vehicle, an end portion of a tail wing, and an end portion of a front portion of a cockpit thereof.

16. The urban air mobility vehicle of claim 14, wherein according to the command according to the first mode, after the unmanned robot moves to a first waiting point spaced from the urban air mobility vehicle by a preset distance based on the information on the location of the urban air mobility vehicle,
the unmanned robot moves from the first waiting point to the UWB tag including a tag ID corresponding to the ID of the unmanned robot based on the information on the shape and the size of the urban air mobility vehicle, the ID of the UWB tag, and the ID of the unmanned robot provided with the UWB anchor corresponding to the UWB tag.

17. The urban air mobility vehicle of claim 16,
wherein according to the command according to the first mode, the unmanned robot rotates along a virtual path including the urban air mobility vehicle, the virtual path being formed to surround the urban air mobility vehicle based on the information on the shape and the size of the urban air mobility vehicle, and
wherein after the unmanned robot stops at a point where an intensity of a wireless signal from the UWB tag including corresponding tag ID is greatest, the unmanned robot moves to the UWB tag including the corresponding tag ID based on information on a distance and a direction to the UWB tag including the corresponding tag ID.

18. The urban air mobility vehicle of claim 13, further including a driving module,
wherein the communication module further receives a moving path and speed for a ground operation, and wherein the control module is configured to control the driving module to move the urban air mobility vehicle according to the received moving path and speed.

19. The urban air mobility vehicle of claim 13, wherein the command according to the second mode includes ID of the unmanned robot and information on a location on the boundary line of the unmanned robot.

20. The urban air mobility vehicle of claim 19, wherein according to the second mode, the unmanned robot moves from a second waiting point to a predetermined location on the boundary line based on the information on the location on the boundary line to form the moving path.

* * * * *